United States Patent Office 2,879,203
Patented Mar. 24, 1959

2,879,203

RECOVERY OF VITAMIN $B_{12}$ FROM DILUTED SOLUTIONS

Pierre Barthelemy, Saint - Germain - en - Laye, Lucien Penasse, Paris, and Gérard Nominé, Noisy-le-Sec, France, assignors to UCLAF, Paris, France, a body corporate of France No Drawing. Application May 22, 1956
Serial No. 586,386

Claims priority, application France May 9, 1956

9 Claims. (Cl. 167—81)

This application relates to vitamin $B_{12}$, and more particularly to well defined derivatives of vitamin $B_{12}$, and to a method of utilizing these new compounds for directly recovering vitamin $B_{12}$ from its natural sources.

It is one object of the present invention to provide a new process for the recovery of vitamin $B_{12}$ from its natural sources.

Another object of the present invention is to provide new and valuable vitamin $B_{12}$ compounds, namely, complex compounds formed by the action of copper cuprocyanide on vitamin $B_{12}$ and having the formula $$C_{63}H_{90}N_{14}O_{14}PCo2([Cu(CN)_2]_2Cu)$$

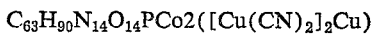

A further object of the present invention is to provide a process of preparing such a new and valuable derivative of vitamin $B_{12}$.

Other objects of the present invention and advantageous features thereof will become apparent as the description proceeds.

In principle, the present invention consists in providing a new process for the recovery of crystalline vitamin $B_{12}$, also named cyanocobalamine. The general formula of vitamin $B_{12}$ is:

$$C_{63}H_{90}N_{14}O_{14}PCo$$

and its constitution has been elucidated by Todd et al. (Nature, 1955, 176, 328). The new process of the present invention proceeds by causing copper-cuprocyanide to act on very dilute solutions of vitamin $B_{12}$, such as fermentation broth. The process can also be used in vitamin $B_{12}$ recovery from other natural sources such as sewage, liver-extracts and very dilute solutions of the pure product.

It is known that the vitamin $B_{12}$ concentration of a fermentation broth (cyano-cobalamine is ordinarily produced by the fermentation of microorganisms such as Schizomycetes, Eumycetes and Myxomycetes, especially Streptomyces) is very low and generally around 1 p.p.m.

The known methods for the recovery of vitamin $B_{12}$ proceed by successive steps, starting generally with a preliminary adsorption on active charcoal, a filtering earth or an ion exchange resin from which cyanocobalamine is eluted together with impurities of similar solubility. Some intermediary purification is then effected by counter-current extraction with benzyl alcohol or by alternating dissolution in a water-immiscible-solvent and in water. According to this process, the aqueous solutions are extracted by a solvent or solvent-mixture which is insoluble in water; a solvent is then added in which vitamin $B_{12}$ is insoluble and the vitamin is extracted with water. Solutions of vitamin $B_{12}$ in substituted or unsubstituted phenols can be extracted by means of aqueous pyridine. Finally, by repeating the distribution process between aqueous and organic layers, it is possible to purify the product. Finally by chromatography on alumina or ion exchange resin, a vitamin $B_{12}$ solution is obtained, the purity of which is about 90%. Precipitation by acetone, followed by one or several recrystallisations, yields usually the pure compound. The extreme dilution of the starting material and the low selectivity of the first adsorbent yield a concentration of about 5/100,000 after the first treatment (i. e. $50\gamma$ vitamin $B_{12}$ p. gram of adsorbent) and entail numerous operations, the use of many different solvents and adsorption-agents on a large scale, and the handling of big volumes which necessitates cumbersome recovery of used solvents.

It was, therefore, of interest and importance to provide the industry with a recovery process which avoids those multifarious operations with large volumes.

In our copending application Serial No. 586,396, filed May 22, 1956, and entitled "Vitamin $B_{12}$ Recovery Process," we have described a new process for the recovery of vitamin $B_{12}$ from its natural sources consisting essentially in precipitating an insoluble zinc-cuprocyanide vitamin $B_{12}$ complex compound, separating said derivative by filtration or centrifugation, isolating vitamin $B_{12}$ from said complex compound with zinc-cuprocyanide by subjecting said complex compound to the action of a chelating agent such as the sodium salt of ethylene diamino tetracetic acid in aqueous medium, extracting vitamin $B_{12}$ by means of an organic solvent or mixture of such solvents in order to remove the mineral products causing, a second extraction into water, and precipitating vitamin $B_{12}$ by the addition of dioxane or another solvent, in which vitamin $B_{12}$ is insoluble to the aqueous extracts. The zinc-cuprocyanide which forms a complex compound with vitamin $B_{12}$ is produced in the fermentation broth by the action of a soluble zinc salt on potassium cuprocyanide, $[Cu(CN)_4]K_3$.

The aforementioned treatment leads to a quantitative recovery. It has now been found that copper cuprocyanide ($[Cu(CN)_2]_2Cu$), may form with vitamin $B_{12}$ a well defined derivative by combination of 2 molecules of copper cuprocyanide with one molecule of vitamin $B_{12}$. Said compound containing 68% of the vitamin $B_{12}$ has the formula:

$$C_{63}H_{90}N_{14}O_{14}PCo2([Cu(CN)_2]_2Cu)$$

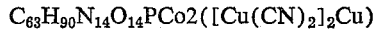

The new compound is a bright red powder, insoluble in water, soluble in dimethylformamide, from which it may be precipitated by the addition of acetone.

In order to form said complex compound, a dilute solution of vitamin $B_{12}$, such as a lysed culture broth or any aqueous extract of vitamin $B_{12}$, is treated with potassium cuprocyanide, $[Cu(CN)_4]K_3$, and then with a soluble copper salt, such as copper sulfate, acetate, etc., the amount of the last mentioned salt being stoichiometric or slightly in excess with regard to the potassium cuprocyanide, said potassium cuprocyanide representing a large excess with regard to the vitamin $B_{12}$ to be extracted. Vitamin $B_{12}$ is generally present in starting aqueous solutions in a concentration of only a few parts per million, whereas the solubility of copper cuprocyanide in water is approximately 1:1000. In order to cause quantitative formation of the copper cuprocyanide vitamin $B_{12}$ complex compound, it is necessary to use a large excess of potassium cuprocyanide, and to add the stoichiometric amount or a slight excess of the copper salt. It is also possible to proceed inversely by first introducing the copper salt and then the potassium cuprocyanide. The precipitated vitamin $B_{12}$-copper cuprocyanide complex compound contains that amount of copper cuprocyanide which is insoluble in water. In the laboratory, the vitamin $B_{12}$ complex compound may be separated from the coprecipitated copper cuprocyanide by extracting the whole precipitate with dimethylformamide in which the complex compound of cyanocobalamine is soluble. The vitamin $B_{12}$ complex compound is then precipitated from its dimethylformamide solution by means of acetone. The vitamin $B_{12}$ is liberated by the addition of a chelating agent which forms a complex salt with the cation. The resulting aqueous solution of vitamin $B_{12}$ is extracted by means of an organic solvent or a suitable mixture of such solvents, before being reextracted in water and precipitated by the addition of dioxane. Industrially, it is not necessary to make a preliminary extraction of the first precipitate.

According to the present invention, the fermentation broth of a microorganism producing the vitamin $B_{12}$ is previously lysed by addition of an agent, such as calcium chloride, which does not interfere with the desired formation of the cyanocobalamine complex compound. Potassium cuprocyanide and a water soluble copper salt are added; a precipitate separates immediately which contains the desired complex compound and the excess of copper cuprocyanide. It is isolated by filtration or centrifugation in the presence or absence of a filter aid, suspended in the water in presence of a chelating agent which forms a complex salt with the cation, such as the tetra-sodium salt of ethylene diamino tetracetic acid (versene) or the trisodium salt of N-hydroxyethyl-ethylene diamino triacetic acid (versenol). The filter aid (if any) is removed by filtration and the resulting aqueous solution is extracted by means of an organic solvent or a suitable solvent mixture such as amyl, butyl or isobutyl alcohol, phenols, a mixture of phenols and halogenated hydrocarbons. The organic solution is reextracted by means of water after addition, if necessary, of a solvent in which vitamin $B_{12}$ is insoluble, such as ether or isopropyl ether. If the organic layer contains a phenol, it is, according to the known art, advantageous to add pyridine to the wash water. A sample is taken from the aqueous solution of vitamin $B_{12}$; the vitamin compound is precipitated by addition of dioxane and the precipitate is tested in account of its purity. If that purity is not sufficient, the total amount of the product is treated once more with the copper cuprocyanide and eventually extracted by means of an organic solvent and water.

The following examples serve to illustrate the present invention without, however, limiting the same thereto. They show also the differences with regard to the known methods. It is, of course, understood that other water soluble copper salts may be employed for the reaction with potassium cuprocyanide than those mentioned and other broth lysing agents if they do not alter the solubility of the desired complex compound. Furthermore, although it is more convenient to operate at room temperature without altering the pH value of the broth, one may heat it to about 80° C. or cool it to +5° C. or render it slightly alkaline without departing from the scope of the present invention.

One may change the filter-aids and use other products than those mentioned. Finally, one may use other chelating agents for copper, especially the sodium salt of nitrilotriacetic acid, the trisodium salt of N-hydroxyethyl ethylene diamino-triacetic acid and other agents capable of forming complex salts with the cation in the form of water soluble derivatives.

It is, at last, understood that the solvents mentioned in the examples for the extraction of vitamin $B_{12}$ from aqueous solutions after chelating the cation only to form a soluble chelate complex compound, merely illustrate the invention without limiting it thereto; any organic solvent or adequate solvent mixture may be used if their distribution coefficient is convenient. Finally, instead of dioxane, one may employ other precipitating solvents without departing from the scope of the present invention.

*Example 1.—Preparation of the copper cyanide vitamin $B_{12}$ complex compound and determination of its composition*

150 mg. of crystalline vitamin $B_{12}$ were dissolved in 10 ml. of water previously heated at 40° C. After cooling to room temperature had been effected, 34.2 mg. of potassium cuprocyanide, $[Cu(CN)_4]K_3$, and 0.18 ml. of a 1 M cupric sulfate solution were added. A bright red precipitate formed. It was allowed to stand overnight in a refrigerator, then filtered on a Büchner funnel, washed with cold (0° C.) water and dried in a vacuum over calcium chloride to constant weight.

*Analysis.*—$C_{63}H_{90}N_{14}O_{14}PCo \cdot 2([Cu(CN)_2]_2Cu)$:

|  | C, percent | H, percent | N, percent | Co, percent | Cu, percent |
|---|---|---|---|---|---|
| Calculated | 43.6 | 4.64 | 15.7 | 3 | 19.5 |
| Found | 42.2 | 4.3 | 15.6 | 2.42 | 19.3 |

This product is completely soluble in dimethylformamide. It is precipitated unchanged on addition of acetone to its solution.

If an excess of potassium cuprocyanide and the corresponding amount of cupric sulfate are added to the same initial solution a precipitate is formed which contains all the vitamin $B_{12}$ of the solution.

*Example 2.—Quantitative recovery of vitamin $B_{12}$ from a dilute solution by means of the copper cyanide vitamin $B_{12}$ complex compound*

200 g. of a veterinary preparation containing 100γ of vitamin $B_{12}$ per gram were extracted 3 times with water by shaking said preparation each time 10 minutes with 1 l. of distilled water. The extracts were filtered. To the obtained brown solution which contained 6.5γ of vitamin $B_{12}$ per cm., there were added 6 g. of potassium cuprocyanide and 35 ml. of a 1 M cupric sulfate solution. The precipitate which formed was allowed to stand overnight in a refrigerator, filtered off on a Büchner funnel, taken up in 150 ml. of water and treated with 30 g. of the sodium salt of ethylene diamino tetracetic acid until dissolved. The solution thus obtained contained 125γ of vitamin $B_{12}$ per ml. In order to purify, 100 g. of ammonium sulfate were added, the vitamin was extracted first with amyl alcohol and then extracted from this solvent with water, and precipitated from the aqueous solution by addition of 10 times its volume of dioxane. The mixture was allowed to stand 2 days in a refrigerator. After filtration and drying, 15 mg. of 98% pure vitamin $B_{12}$ were obtained. The remaining activity was found in the mother liquor.

*Example 3.—Recovery of vitamin $B_{12}$ from a dilute solution, i.e. from fermentation broth, by means of copper cuprocyanide*

40 l. of a fermentation broth of *Streptomyces olivaceus* containing 775γ of vitamin $B_{12}$ per liter (31 mg. in all) were lysed under agitation by means of 1.040 g. of calcium chloride for 3 hours at 50° C. After cooling to 35° C., 80 g. of potassium cuprocyanide and, at once, under slight agitation, 111 g. of cupric sulfate (1.5 mols) were added. After standing for 1 hour, the brown precipitate which formed was separated by centrifugation. The remaining green liquor contained no more vitamin $B_{12}$. The centrifuged precipitate was suspended under strong agitation in 2 l. of water. 400 g. of the sodium salt of ethylene diamino tetracetic acid were added and agitation was continued to cause complete dissolution. After addition of 1,000 g. of ammonium sulfate, the mixture was extracted 3 times by 600 ml. of amyl alcohol. The amyl alcoholic solution was then extracted with water (3 x 60 ml.). To the aqueous solution thus obtained, there were added 0.36 g. of potassium cuprocyanide and 5 ml. of a 10% cupric sulfate solution. A red precipitate which formed was centrifuged. Dispersing in water, binding the metal cation by formation of a chelate complex compound as described hereinbefore, extracting the vitamin $B_{12}$ as previously described with amyl alcohol, thoroughly extracting the organic phase with water and precipitating the vitamin $B_{12}$ by adding 10 times its volume of dioxane to the aqueous solution yielded 25 mg. of a 97% cryst. cyanocobalamine. The remaining activity is found in the mother liquor which can be added to a new recovery operation. After recrystallization from aqueous dioxane (10:1), 22 mg. of pure cryst, vitamin $B_{12}$ were obtained.

We claim:

1. In a process of recovering vitamin $B_{12}$ from an aqueous solution containing said vitamin and impurities, the steps which comprise producing copper cuprocyanide in said vitamin $B_{12}$-containing solution by adding an alkali metal cuprocyanide and a water soluble copper salt to said vitamin $B_{12}$-containing solution, thereby precipitating the copper cuprocyanide-vitamin $B_{12}$ complex compound, separating said precipitated complex compound from the solution, and treating said complex compound with an aqueous solution of a chelating agent forming a water-soluble copper salt, and extracting vitamin $B_{12}$ from the resulting aqueous solution by means of a water immiscible organic solvent therefor.

2. In a process of recovering vitamin $B_{12}$ from an aqueous solution containing said vitamin and impurities, the steps which comprise producing copper cuprocyanide in said vitamin $B_{12}$-containing solution by adding an alkali metal cuprocyanide and a water soluble copper salt to said vitamin $B_{12}$-containing solution, thereby precipitating the copper cuprocyanide-vitamin $B_{12}$ complex compound, separating said precipitated complex compound from the solution, treating the resulting precipitate with an aqueous solution of a chelating agent forming a water soluble copper salt, extracting vitamin $B_{12}$ from the resulting aqueous solution by means of a water-immiscible organic solvent for vitamin $B_{12}$, extracting the resulting extract in said organic solvent with water, and adding to the resulting aqueous extract a water-miscible organic solvent in which vitamin $B_{12}$ is insoluble, in an amount sufficient to precipitate substantially pure vitamin $B_{12}$.

3. The process according to claim 2, wherein the chelating agent is an agent selected from the group consisting of the sodium salt of ethylene diamino tetraacetic acid, the sodium salt of N-hydroxy ethyl ethylene diamino triacetic acid, and the sodium salt of nitrilo triacetic acid.

4. The process according to claim 2, wherein the water-immiscible organic solvent for vitamin $B_{12}$ is amyl alcohol and wherein the water-miscible organic solvent in which vitamin $B_{12}$ is insoluble, is dioxane.

5. In a process of recovering vitamin $B_{12}$ from fermentation broth containing said vitamin $B_{12}$ and impurities, the steps which comprise producing copper cuprocyanide in said fermentation broth by adding an alkali cuprocyanide and a water soluble copper salt to said fermentation broth, thereby precipitating the copper cuprocyanide-vitamin $B_{12}$ complex compound, separating said precipitated complex compound from the fermentation broth, and treating said complex compound with an aqueous solution of a chelating agent forming a water-soluble copper salt, and extracting vitamin $B_{12}$ from the resulting aqueous solution by means of a water immiscible organic solvent therefor.

6. In a process of recovering vitamin $B_{12}$ from fermentation broth containing said vitamin $B_{12}$ and impurities, the steps which comprise producing copper cuprocyanide in said fermentation broth by adding an alkali metal cuprocyanide and a water soluble copper salt to said fermentation broth, thereby precipitating the copper cuprocyanide-vitamin $B_{12}$ complex compound, separating said precipitated complex compound from the fermentation broth, treating the resulting precipitate with an aqueous solution of a chelating agent forming a water soluble copper salt, extracting vitamin $B_{12}$ from the resulting aqueous solution by means of a water-immiscible organic solvent for vitamin $B_{12}$, extracting the resulting extract in said organic solvent with water, and adding to the resulting aqueous extract a water-miscible organic solvent in which vitamin $B_{12}$ is insoluble, in an amount sufficient to precipitate substantially pure vitamin $B_{12}$.

7. The process according to claim 6, wherein the chelating agent is an agent selected from the group consisting of the sodium salt of ethylene diamino tetraacetic acid, the sodium salt of N-hydroxy ethyl ethylene diamino triacetic acid, and the sodium salt of nitrilo triacetic acid.

8. The process according to claim 6, wherein the water-immiscible organic solvent for vitamin $B_{12}$ is amyl alcohol and wherein the water-miscible organic solvent in which vitamin $B_{12}$ is insoluble, is dioxane.

9. The substantially water-insoluble copper cuprocyanide-vitamin $B_{12}$ complex compound of the formula $C_{63}H_{90}N_{14}O_4PCo \cdot 2[Cu(CN)_2]_2Cu$ having a bright red color, said complex compound being stable and not being decomposed on treatment with organic solvents, said complex compound being soluble in dimethyl formamide and being precipitated from its solution in dimethyl formamide by the addition of acetone, said complex compound being split up to form vitamin $B_{12}$ by treatment with an aqueous solution of a chelating agent forming a soluble complex salt with copper.

References Cited in the file of this patent

UNITED STATES PATENTS

| | | |
|---|---|---|
| 2,621,144 | Holland | Dec. 9, 1952 |
| 2,648,592 | Stanton | Aug. 11, 1953 |
| 2,678,900 | Denkewalter | May 18, 1954 |